(12) United States Patent  
Lazzeroni

(10) Patent No.: US 7,097,239 B2
(45) Date of Patent: Aug. 29, 2006

(54) MOTOR VEHICLE FRONT PORTION ASSEMBLY PROVIDED WITH IMPROVED FASTENING AND POSITION-ADJUSTMENT MEANS, AND A MOTOR VEHICLE INCLUDING SUCH AN ASSEMBLY

(75) Inventor: Eric Lazzeroni, Welzhein (DE)

(73) Assignee: Faurecia Bloc Avant, Nanterre (FR)

( * ) Notice: Subject to any disclaimer, the term of this patent is extended or adjusted under 35 U.S.C. 154(b) by 0 days.

(21) Appl. No.: 11/011,376

(22) Filed: Dec. 15, 2004

(65) Prior Publication Data

US 2005/0134092 A1 Jun. 23, 2005

(30) Foreign Application Priority Data

Dec. 19, 2003 (FR) ................................... 03 15097

(51) Int. Cl.
*B60K 7/00* (2006.01)
(52) U.S. Cl. .............................. 296/203.01; 296/193.09
(58) Field of Classification Search .......... 296/203.01, 296/203.02, 198, 193.09
See application file for complete search history.

(56) References Cited

U.S. PATENT DOCUMENTS

| 6,386,624 B1 | 5/2002 | Billiu et al. | |
| 6,523,886 B1* | 2/2003 | Hoffner et al. | 296/203.02 |
| 6,729,681 B1* | 5/2004 | Yustick | 296/203.02 |
| 6,755,461 B1* | 6/2004 | Seksaria et al. | 296/203.02 |
| 6,895,647 B1* | 5/2005 | Matsumoto et al. | 29/281.4 |
| 6,923,495 B1* | 8/2005 | Kishikawa et al. | 296/193.09 |
| 7,007,385 B1* | 3/2006 | Tarahomi | 296/193.09 |
| 7,014,257 B1* | 3/2006 | Lazzeroni et al. | 296/193.09 |

FOREIGN PATENT DOCUMENTS

| DE | 199 49 467 | 3/2001 |
| EP | 1 232 932 | 8/2002 |
| FR | 2 783 797 | 3/2000 |

* cited by examiner

Primary Examiner—Kiran B. Patel
(74) Attorney, Agent, or Firm—Young & Thompson

(57) ABSTRACT

The assembly includes:
  a front face;
  a structural front portion (4);
  a fender front portion (5);
  a flexible beam (43); and
  a headlight unit fastened to said beam (43).

It further comprises:
  a centering and guide part (71) fastened to the structural front portion, in a position that can be adjusted, during assembly, along three axes (X, Y, Z);
  fastening and centering means (83, 85) for fastening the end (43B) of the beam to said part (71) and for centering it thereon; and
  guide means (93, 95) for guiding the fender front portion (5) on said part (71), providing a sliding connection slidable along one of the three axes (X), making relative adjustment movements possible in order to absorb deformation in said fender front portion. The invention is also relates to a motor vehicle including such an assembly.

12 Claims, 9 Drawing Sheets

MOTOR VEHICLE FRONT PORTION ASSEMBLY PROVIDED WITH IMPROVED FASTENING AND POSITION-ADJUSTMENT MEANS, AND A MOTOR VEHICLE INCLUDING SUCH AN ASSEMBLY

The present invention relates to a motor vehicle front portion assembly comprising:
- a rigid front face and, on either side of said front face:
- a structural front portion;
- a fender front portion;
- a flexible beam that projects transversely to said front face, said beam having a first end fastened to said front face, and a second end connected to said fender front portion; and
- a headlight unit fastened to said beam.

BACKGROUND OF THE INVENTION

Such an assembly is described, for example, in Document EP-A-1 232 932.

The structure described in that document makes it possible for the visible outlines of the headlight units to be positioned automatically and permanently relative to the corresponding fender ends and relative to the bumper skin. At the same time, that structure guarantees that the bumper skin is positioned accurately relative to the fender ends.

On certain vehicles, it is chosen for the fender front portions to be made of a plastics material rather than of sheet metal. Such a choice of technology, which offers certain advantages, nevertheless results in the fender front portions undergoing relatively considerable deformation over the life of the vehicle. In certain preferred directions of deformation, such as the longitudinal direction of the fender of the vehicle, such deformation can be of the order of a few millimeters, whereas it is not significant when the fenders are made of metal.

Via the connection existing between the fender front portion and the corresponding beam, such deformation can, after the front portion assembly of the vehicle has been assembled, and during the life of the vehicle, give rise to significant deformation of the beam, and thereby cause uncontrollable misadjustment of the orientation and of the position of the headlight unit supported by the beam.

OBJECTS AND SUMMARY OF THE INVENTION

An object of the invention is to remedy that drawback, and to propose a vehicle front portion assembly of the above type that is compatible with using a fender front portion which is not made of metal, and in particular which is made of a plastics material, and that, for this purpose, preserves the adjustments of the headlight units from the effects of deformation of the fender.

This object is achieved by the invention, according to which the front portion assembly of the above-described type further comprises:
- a centering and guide part fastened to the structural front portion, in a position that can be adjusted, during assembly, along three substantially orthogonal axes, namely a first axis, a second axis, and a third axis;
- fastening and centering means for fastening the second end of the beam to said part and for centering it thereon; and
- guide means for guiding the fender front portion on said part, providing a sliding connection slidable along the third axis;

so that a connection with the possibility of sliding along said third axis is provided between the second end of the beam and the fender front portion, after assembly, via said centering and guide part, in order to make relative adjustment movements possible and in order to accommodate deformation of said fender front portion.

According to other optional characteristics of the invention, taken on their own or in any technically feasible combination:
- the centering and guide part is provided firstly with a centering member which co-operates with a complementary centering member integral with the second end of the beam, and secondly with a guide member which co-operates with a complementary guide member integral with the fender front portion;
- the assembly further comprises a centering and guide device, comprising firstly said centering and guide part, and secondly a support part which is fastened to the structural front portion in a position that can be adjusted along the second axis and along the third axis, and to which the centering and guide part is fastened in a position that can be adjusted, during assembly, along the first axis;
- the support part is fastened to the structural front portion by means of a clamping bolt engaged in a square hole, extending along the second axis and along the third axis;
- the centering and guide part is fixed to the support part by means of a clamping bolt engaged in an oblong hole which is elongate along the first axis;
- the guide member and the complementary guide member are provided with indexing complementary shapes defining a nominal relative position of the fender front portion and of the second end of the beam, from which position the adjustment movements take place;
- the centering member and the complementary centering member have complementary frustoconical shapes organized to interfit coaxially along a common axis corresponding substantially to the third axis;
- the guide member is a slideway, and the complementary guide member is a rail projecting from a flange of the fender front portion;
- the complementary guide member is formed of a part with a reinforcement part for reinforcing the flange, which part is separate and is mounted on and fastened rigidly to said fender flange;
- the third axis is such that it corresponds substantially to the longitudinal direction of the vehicle, when the assembly is mounted on the vehicle; and
- the fender front portion is made of a plastics material.

The invention also provides a motor vehicle including a front portion assembly as described above.

BRIEF DESCRIPTION OF THE DRAWINGS

An embodiment of the invention is described in more detail below with reference to the accompanying drawings, in which.

MORE DETAILED DESCRIPTION

Figure 1:
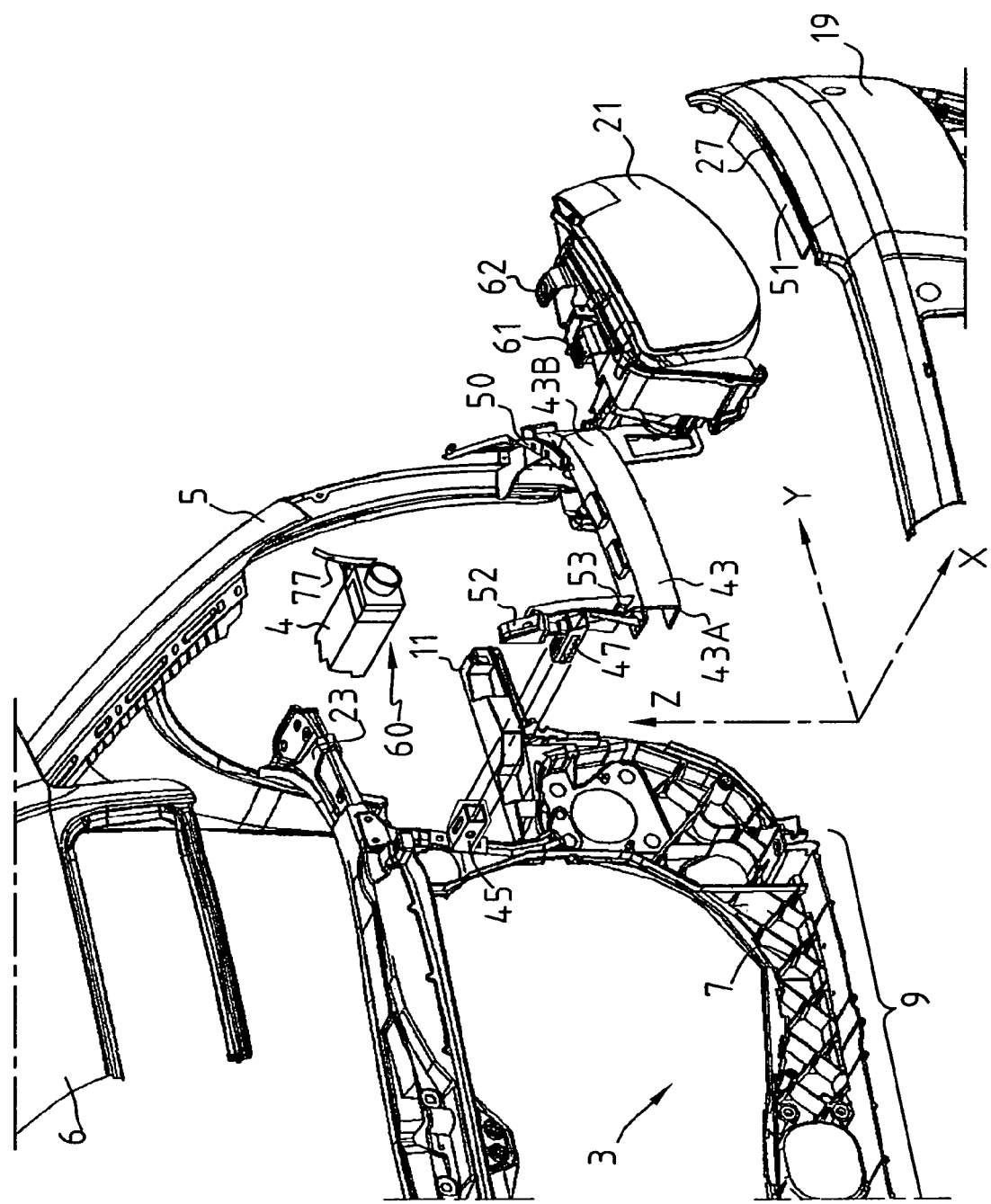
FIGS. 1 and 2 are front exploded perspective views seen looking from different directions of a vehicle front portion assembly of the invention, and of a hood portion of the vehicle.
Figure 2:
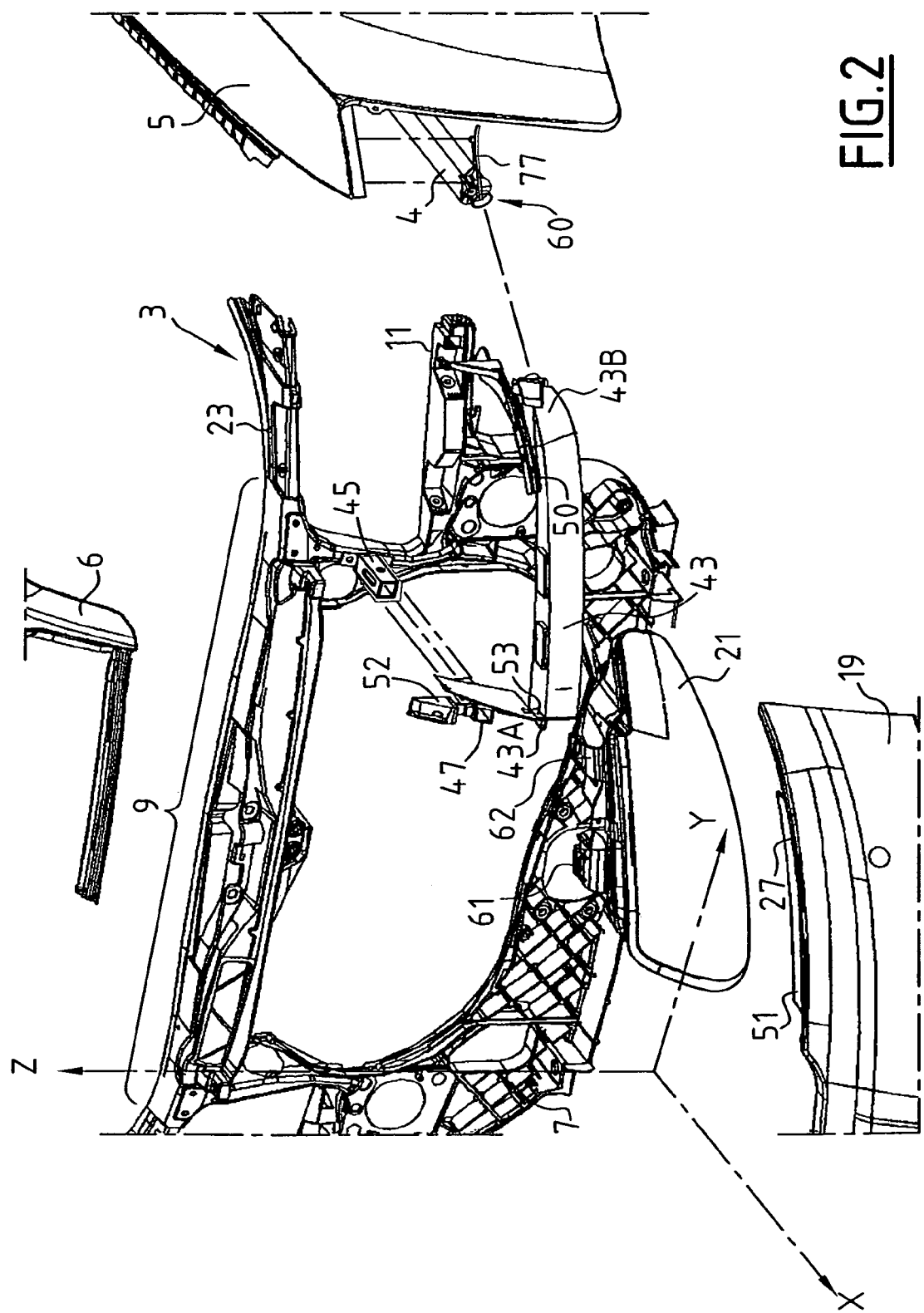

FIGS. 1 and 2 show a motor vehicle front portion assembly comprising a front unit 3 (shown in part), a structural front portion 4, and a front end 5 of a fender. A front end 6 of the hood of the vehicle is also shown.

FIGS. 1 and 2, and the other figures, are oriented relative to three axes X, Y, Z that correspond to the usual orientation of the vehicle, namely respectively the longitudinal axis X oriented in the forward direction, the transverse axis Y oriented from right to left, from the driver's point of view, and the vertical axis Z oriented from bottom to top. All of the terms used in the description below and that indicate a direction or a position should be understood with reference to this system of axes.

The vehicle front portion shown in FIGS. 1 and 2 is symmetrical or almost symmetrical about a vertical midplane of the vehicle. For reasons of clarity, only the portion situated on the left of the vehicle is shown in the figures and described.

The front unit 3 of the vehicle comprises a substantially rigid structure constituted by a front face 7 which has a central portion 9 and a side portion 11.

The front unit 3 further comprises a bumper skin 19, e.g. made of a piece of plastics material, which is disposed over the entire width of the front face 7, while projecting beyond the side portions 11 of the front face, and being applied against an edge of the fender front end 5, while coinciding with said edge.

On either side, the front unit 3 further comprises a headlight unit 21 mounted on the front face in a complementary shape, under a top edge 23 thereof, and above a top edge 27 of the bumper skin 19.

On either side, the front unit 3 further comprises a curved beam 43 extending laterally in the same direction as the bumper skin 19. The curved beam 43 has a first end 43A fastened to the central portion 9 of the front face, via complementary locking means 45, and a second end 43B connected firstly to the fender front portion 5, and secondly to the structural portion 4.

The structural front portion 4 is, for example, constituted by a side-rail segment or by a metal wall of the body of the vehicle. Said structural portion can be of any other suitable type, i.e. stationary relative to the chassis, and substantially non-deformable.

The beam 43 is flexible insofar as, when it is mounted on the vehicle, and once one of its ends 43A, 43B has been fastened to the front face 7 or to the structural front portion 4, its other end can be moved by elastically deforming the beam so as to take up the clearances between the various parts of the front portion and so as to ensure that they are flush with one another.

In particular, the flexural rigidity of the front face 7 and the flexural rigidity of the structural portion 4 are considerably greater than the flexural rigidity of the beam 43.

A gutter 50 is formed in the top portion of the beam 43 and extends in the same general direction as the beam 43. Said gutter 50 receives a flap 51 projecting from the top edge 27 of the bumper skin 19, so as to fasten the bumper skin 19 to the beam 43, with relative adjustment movements being possible in the same general direction as the beam 43.

The beam 43 is adapted to support the respective headlight unit 21. For this purpose, the beam 43 is provided with vertical plane abutment faces 52, 53 facing towards the second or "outer" end 43B of the beam 43 and serving to co-operate with corresponding projections (not shown) projecting outwards from the headlight unit 21, so that said headlight unit is positioned accurately relative to the beam 43 in the direction Y. The headlight unit 21 is fastened rigidly to the beam 43 by locking means (not shown) such as nuts and bolts.

It should be noted that, in the example shown, the locking means 45 for locking the first end 43A of the beam to the central portion 9 of the front face comprise two complementary hollow sleeves of rectangular section, and rigid fastening members (not shown), such as rivets or bolts, making it possible to secure the two sleeves together in a coaxially interfitted position.

In the example shown, the fender, the front portion 5 of which is shown in the figures, is made of a non-metal material, and more precisely of a plastics material.

FIGS. 1 and 2 also show a centering and guide device 60 which is fastened to the structural portion 4, and which is part of the assembly of the invention. As will be explained in detail below, said device 60 provides the connections between the fender 5, the beam 43, and the structural portion 4.

The connections between the fender 5, the beam 43, and the structure 4 are described more precisely below with reference to FIGS. 3 to 5.

Figure 3:
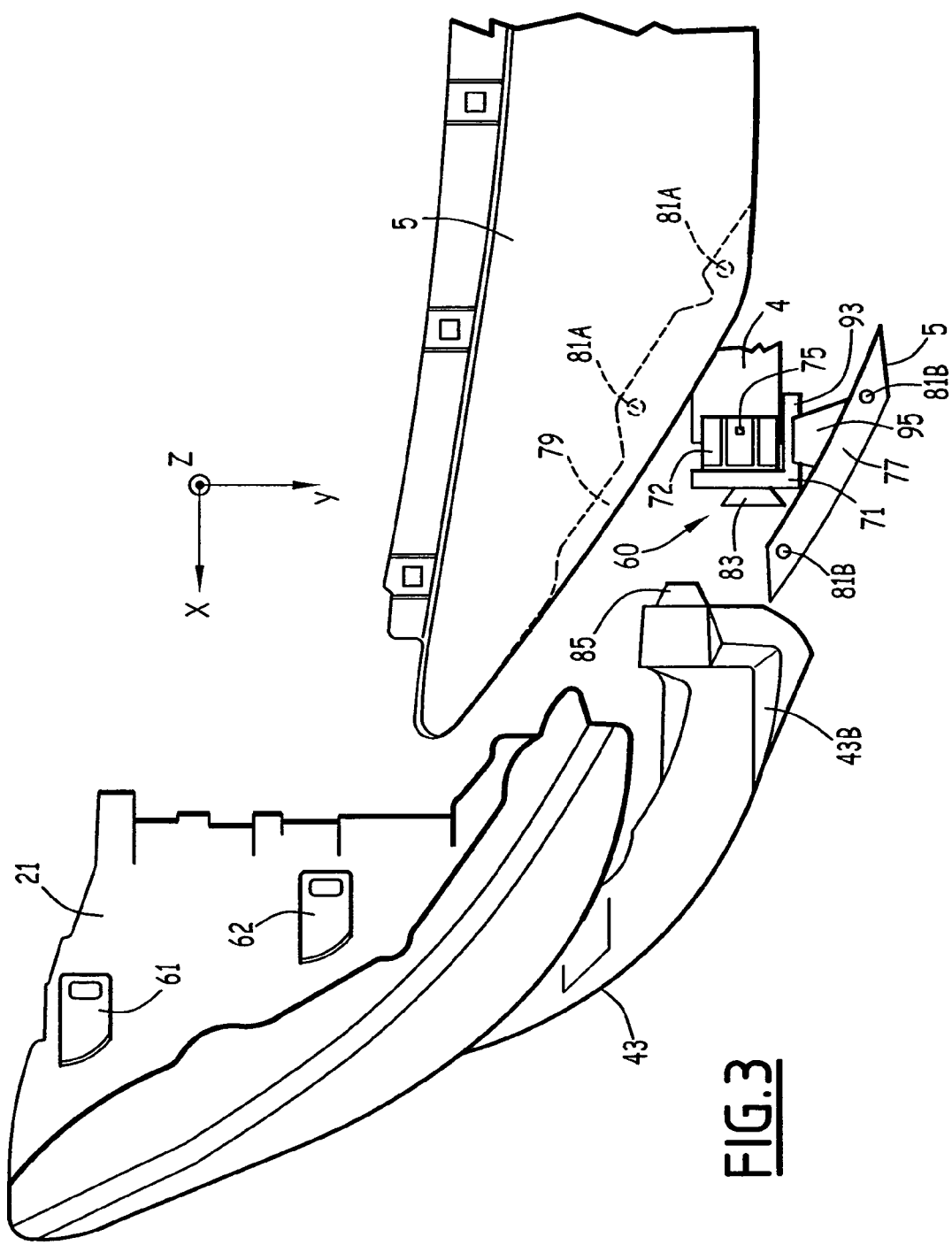
FIG. 3 is a diagrammatic exploded view seen from above and on a larger scale of a detail of FIGS. 1 and 2, corresponding to the connection region in which the beam, the fender, and the structural portion are connected together.
Figure 4:
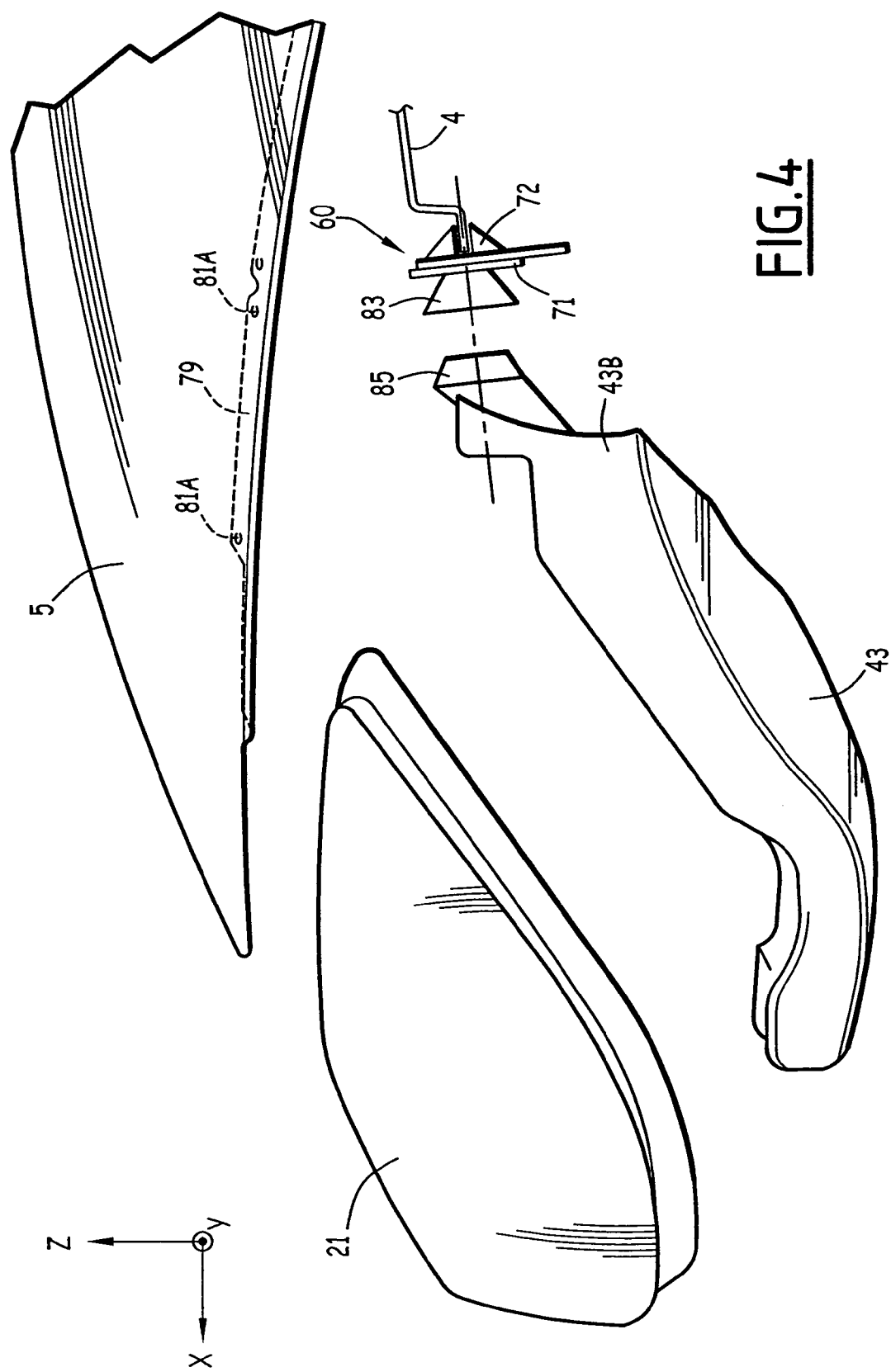
FIG. 4 is a diagrammatic exploded view seen from the side and corresponding to FIG. 3.
Figure 5:
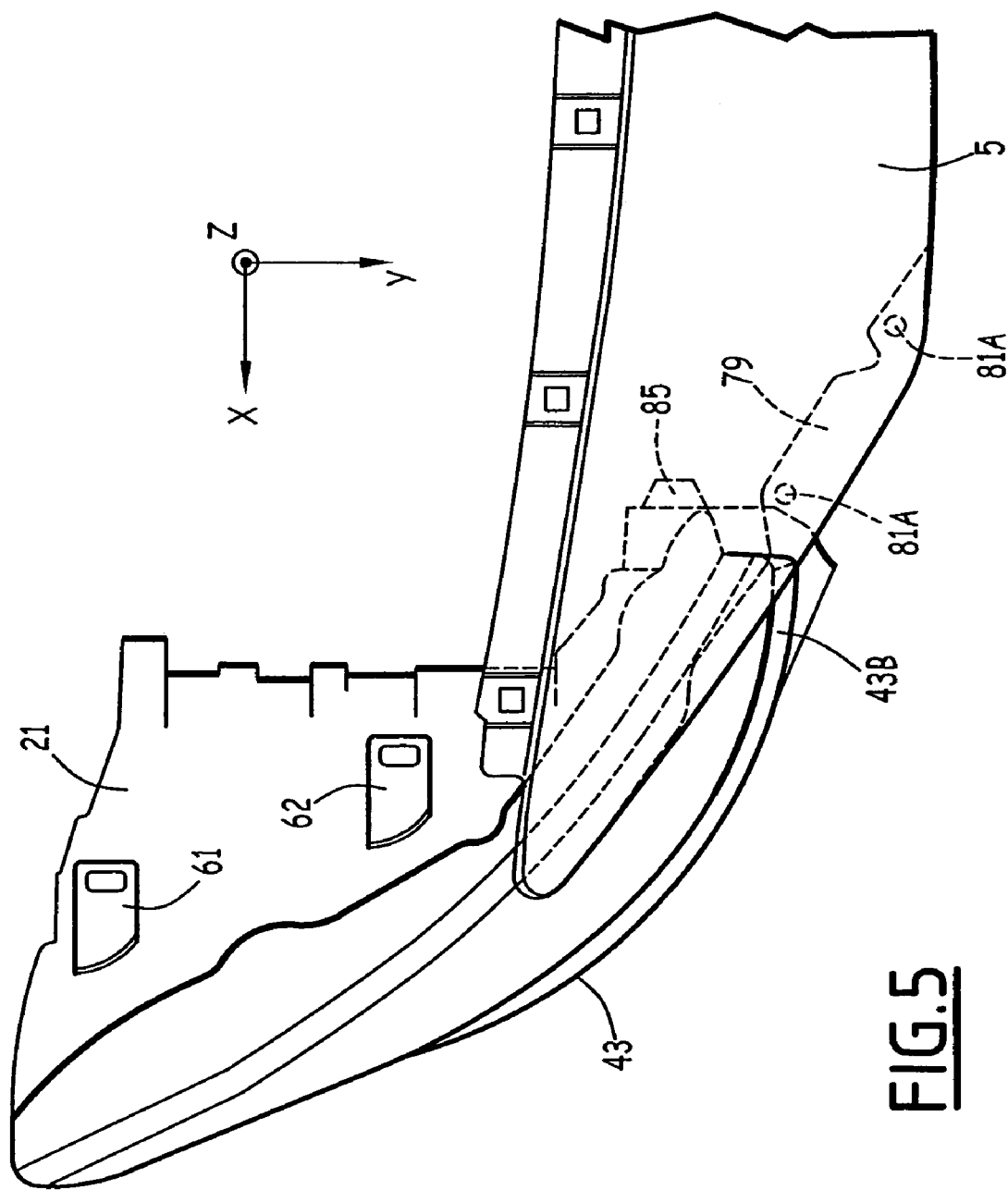
FIG. 5 is a fragmentary view analogous to FIG. 3, with the elements shown being in the assembled-together configuration.

For reasons of clarity, in addition to the structural portion 4, to the fender 5, and to the beam 43, FIGS. 3 to 5 also show the headlight unit 21 which, as can be seen, is provided with two fastening catches 61, 62 for fastening to the front face 7. The fastening catches 61, 62 are provided on a top face of the headlight unit 21, and each of them is provided with an oblong hole allowing the position and the orientation of the headlight unit 21 in the front face 7 to be adjusted.

As shown diagrammatically in FIGS. 3 and 4, the centering and guide device 60 is made up essentially of two parts 71, 72.

The first part 71 is a centering and guide part organized to co-operate with complementary portions, respectively of the beam 43 and of the fender 5.

The second part 72 is a support part for rigidly fastening the device 60 to the structural portion 4.

In the example shown, such rigid fastening is achieved by a bolt engaged in a square hole 75 in the support part 72 and/or in the structural part 4. The square hole 75 extends along the axes X, Y so that the fastening allows the position of the device 60 to be adjusted on the structural part 4 along said axes X, Y.

As shown diagrammatically in FIG. 3, the fender portion 5 is provided with a reinforcement part 77 secured to a fender flange 79 folded over inwards. In the example shown, the reinforcement part 77 is separate from and is mounted onto the fender flange and fastened rigidly thereto at two fastening points 81. For example, the fastening points are defined firstly by tapped holes 81B provided in vertical wells in the reinforcement part 77, and secondly by corresponding smooth holes 81A provided in the flange 79.

FIG. 3 also diagrammatically shows that the centering and guide part 71 is provided firstly with a centering member 83 organized to co-operate with a complementary centering member 85 projecting from the end 43B of the beam, and secondly with a guide member 93 organized to co-operate with an complementary guide member 95 projecting from the reinforcement part 77.

Figure 6:
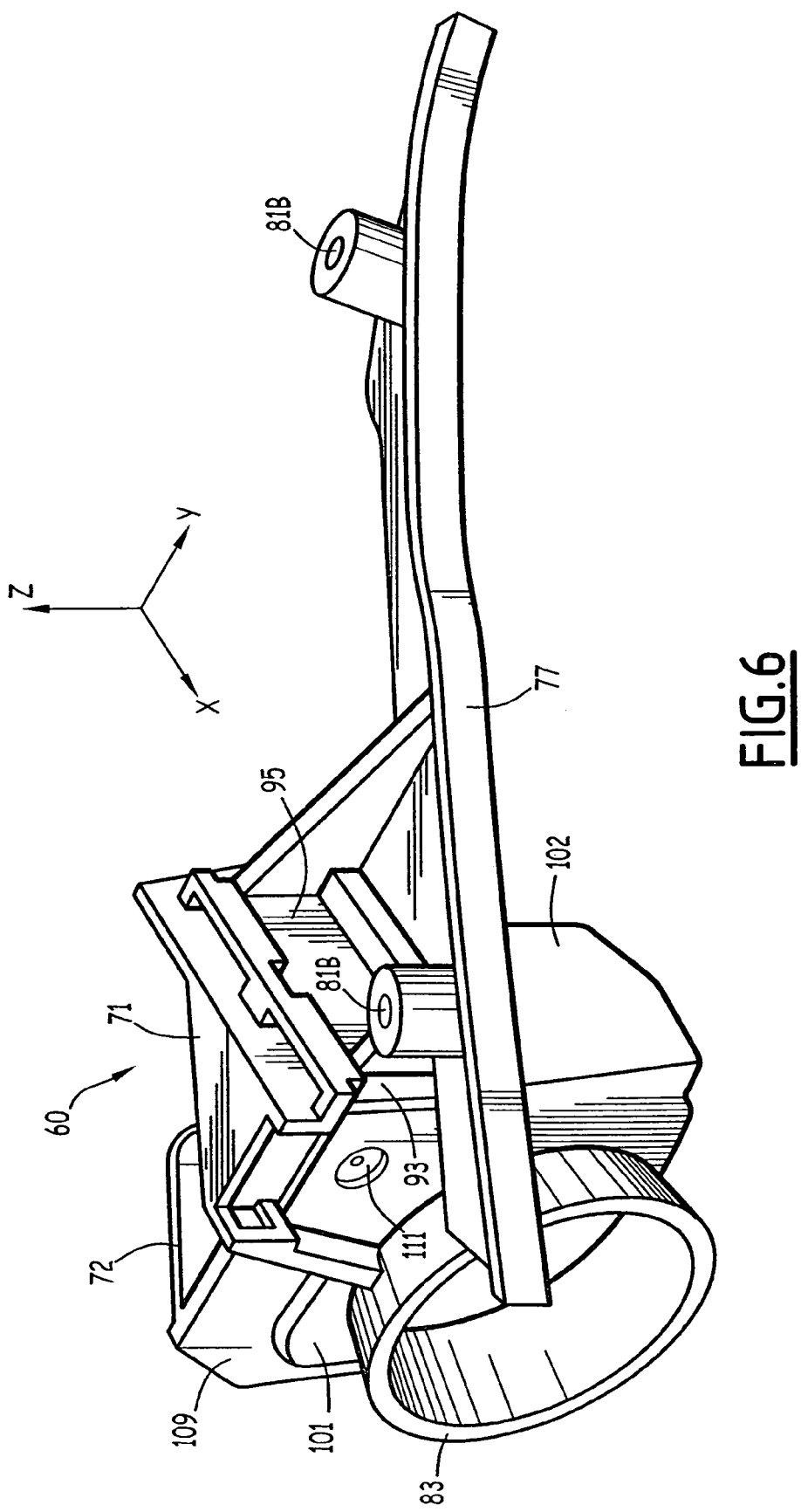
FIGS. 6 and 7 are perspective views seen respectively from the front and from the rear of the centering and guide device forming the connection between the beam and the fender, and of a reinforcement part for reinforcing the fender front portion.
Figure 7:
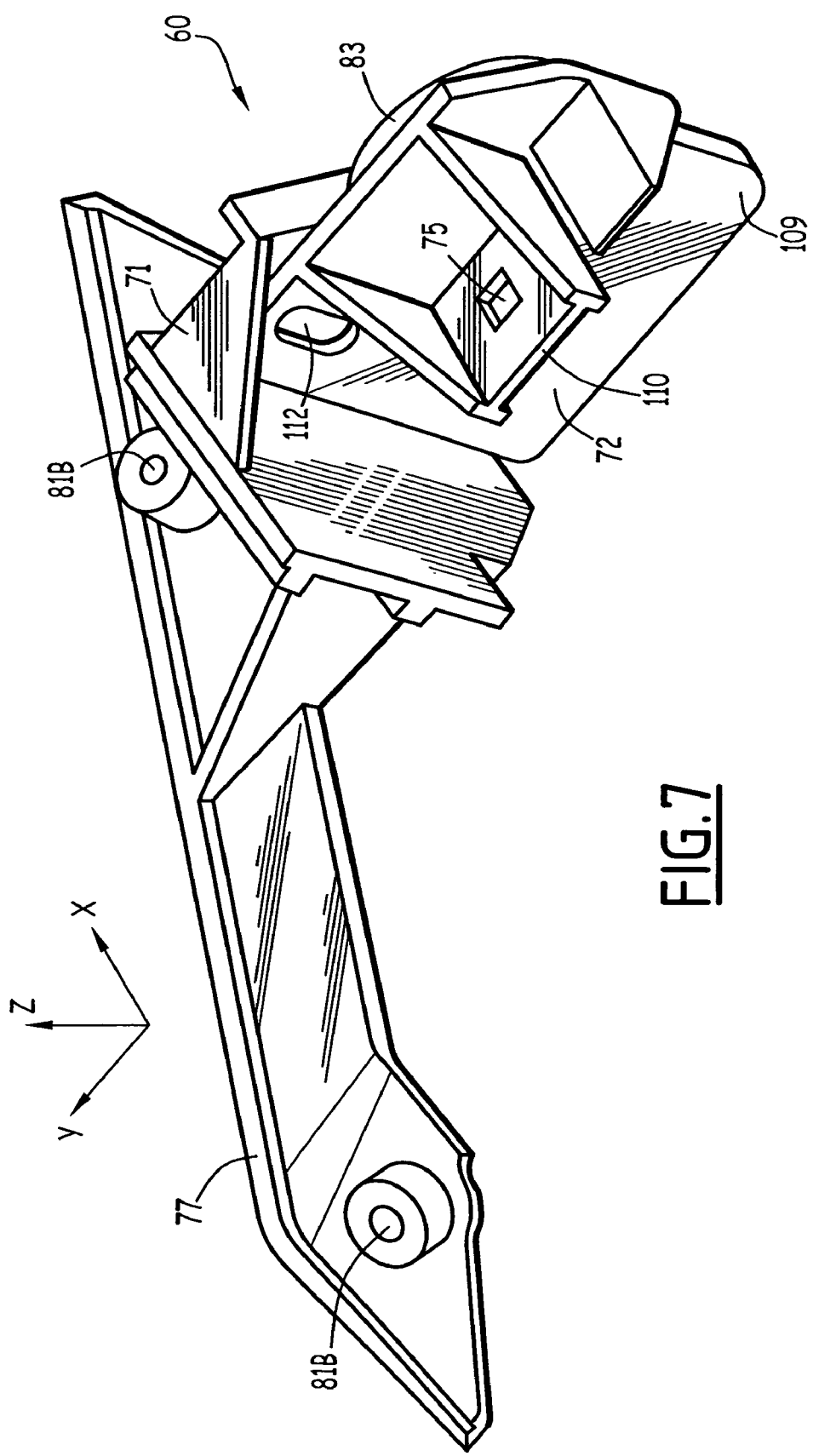
Figure 8:
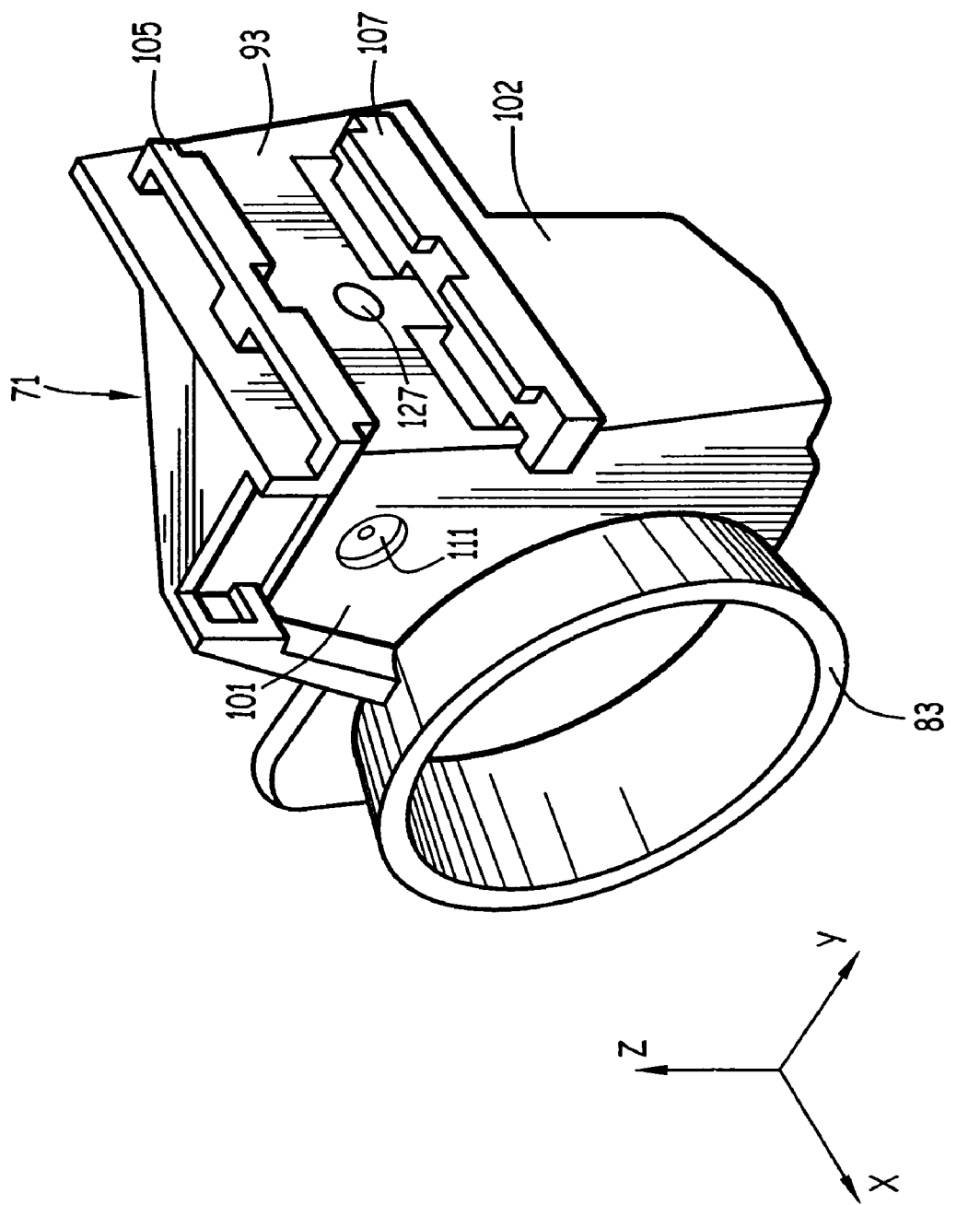
FIG. 8 is a view analogous to FIG. 6 of a portion of the centering and guide device.

As shown more clearly in FIGS. 6 and 8, the centering member 83 has a hollow frustoconical shape, while the member 85 has a male complementary frustoconical shape. The two members 83, 85 are arranged respectively on the device 60 and on the beam 43, so as to be suitable for interfitting coaxially along the direction of the X-axis when the assembly is assembled. For this purpose, the flared opening of the frustoconical member 83 faces forwards, while the free end defining the smaller-diameter base of the complementary frustoconical member 85 faces backwards.

Reference is made below more particularly to FIGS. 6 to 9 which show in more detail the connection between the flange 5, via its reinforcement part 77, and the centering and guide device 60. FIGS. 6 to 9 also make it possible to show in more detail the structure of the device 60 and of the reinforcement part 77.

It should firstly be noted that the centering and guide part 71 is in the general shape of an L-shaped bracket, and it essentially comprises two orthogonal walls, one of which (101) supports the frustoconical centering member 83 projecting therefrom, the other wall 102 supporting the guide member 93.

The guide member 93 is shaped like a slideway extending substantially along the X-axis, the slideway being defined by two parallel runners 105, 107, namely a top runner and a bottom runner, projecting from the wall 102, and extending substantially along the X-axis.

The support part 72 is shaped essentially like a plate 109 fastened to the part 71 while bearing flush against the back of the wall 101.

A fastening tab 110 is formed projecting backwards from the plate 109, and provided with the square hole 75 making it possible to fasten the part 72 and thus the device 60 to the structural part 4 adjustably along X and Y.

A circular hole 111 and an oblong hole 112 that is elongate along the Z-axis are formed correspondingly respectively in the wall 101 and in the plate 109. The holes 111, 112 are organized to receive a clamping member such as bolt jointly in engagement. It can be understood that the parts 71 and 72 are thus fastened rigidly together, and the relative positioning of the fastening can be adjusted along the Z-axis.

It can be understood from the above description that the centering and guide part 71 can be fastened to the structural portion 4 via the support part 72, with adjustment being possible along all three orthogonal axes X, Y, and Z.

Figure 9:
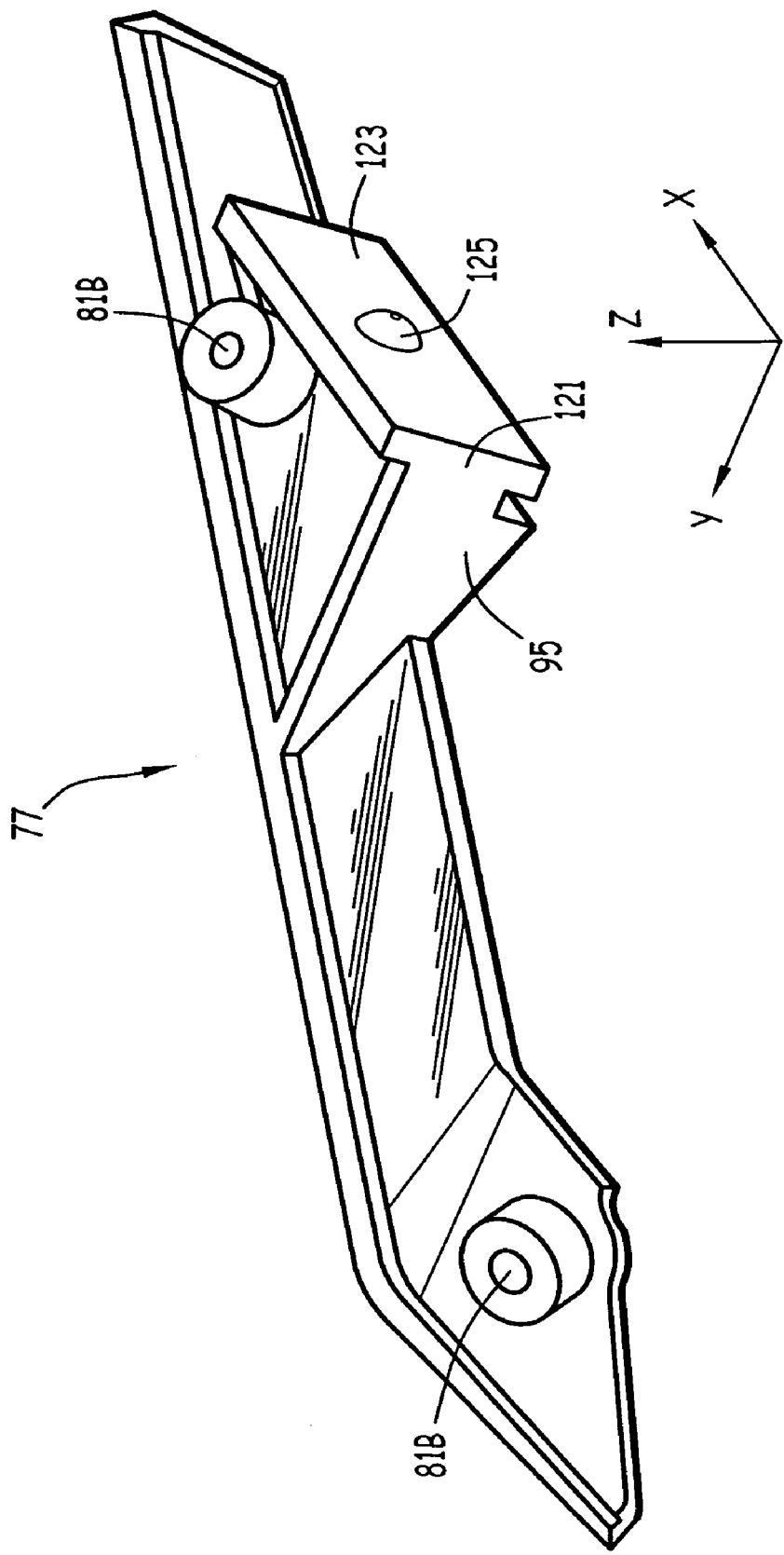
FIG. 9 is a view analogous to the FIG. 7 view of the fender portion reinforcement part on its own.

With reference more particularly to FIG. 9, it is possible to observe that the member 95 that is complementary to the slideway 93 is formed by a rail projecting from the reinforcement part 77. The free end section of the rail has the general shape of a rectangular plate 121, organized to be engaged to slide freely in the slideway 93. The free face 123 of the plate 121, which face faces the backplane of the slideway, has a central hemispherical dome 125 projecting from it. Correspondingly, the backplane wall of the slideway 93 is provided with a complementary recess 127, organized to receive the dome 125, and thus to define a stop notch associated with a reference position, i.e. an assembly nominal relative position for the fender front portion 5 and for the end 43B of the beam. In other words, the dome 125 and the complementary recess 127 constitute complementary shapes providing indexing for assembling the assembly.

Starting from this nominal position, the reinforcement part 77, and the entire fender front portion 5, since it is secured thereto, can have its position adjusted relative to the structural part 4, to the device 60, and thus to the beam 43, when the fender 5 is subjected to deformation, by the rail 95 being caused to undergo adjustment movements in the slideway 93 along the longitudinal direction X.

Provision is made for the adjustment movements to have an amplitude of a few millimeters (e.g. 2 or 3 millimeters) on either side of the reference position.

By using the fastening and centering means defined by the complementary frustoconical members 83, 85, it is possible to guarantee that the end 43B of the beam is positioned accurately and stably relative to the structural part 4 and to the fender front portion 5, such positioning being adjustable along X, along Y, and along Z relative to the stationary part 4, during assembly.

By using the guide means for guiding the fender front portion 5 relative to the stationary part 4, which means are constituted by the slideway 93 and by the complementary rail 95, a sliding connection that is self-adjustable along X is provided that makes relative adjustment movements possible after the fender has been mounted on the vehicle, so as to compensate for deformation in the fender, without affecting the adjustment of the position of the beam, or, therefore the adjustment of the position and of the orientation of the corresponding headlight unit 21.

The above-described vehicle front portion assembly, and in particular the centering and guide device, makes it possible to obtain possibilities of adjustment along all three axes, by distinct fastening parts, and a possibility of automatic adjustment after assembly along one of the three axes, organized to be the preferred axis of deformation of the fender.

What is claimed is:

1. A motor vehicle front portion assembly comprising:
   a rigid front face (7) and, on either side of said front face:
   a structural front portion (4);
   a fender front portion (5);
   a flexible beam (43) that projects transversely to said front face (7), said beam having a first end (43A) fastened to said front face portion (7), and a second end (43B) connected to said fender front portion (5); and
   a headlight unit (21) fastened to said beam (43);
   said front portion assembly further comprising:
   a centering and guide part (71) fastened to the structural front portion (4), in a position that can be adjusted, during assembly, along three substantially orthogonal axes, namely a first axis (Z), a second axis (Y), and a third axis (X);
   fastening and centering means (83, 85) for fastening the second end (43B) of the beam to said part (71) and for centering it thereon; and
   guide means (93, 95) for guiding the fender front portion (5) on said part (71), providing a sliding connection slidable along the third axis (X);
   so that a connection with the possibility of sliding along said third axis (X) is provided between the second end (43B) of the beam and the fender front portion (5), after assembly, via said centering and guide part (71), in order to make relative adjustment movements possible and in order to absorb deformation in said fender front portion (5).

2. An assembly according to claim 1, wherein the centering and guide part (71) is provided firstly with a centering member (83) which co-operates with a complementary centering member (85) integral with the second end (43B) of the beam, and secondly with a guide member (93) which co-operates with a complementary guide member (95) integral with the fender front portion (5).

3. An assembly according to claim 2, further comprising a centering and guide device (60), comprising firstly said centering and guide part (71), and secondly a support part (72) which is fastened to the structural front portion (4) in a position that can be adjusted along the second axis (Y) and along the third axis (X), and to which the centering and guide part (71) is fastened in a position that can be adjusted, during assembly, along the first axis (Z).

4. An assembly according to claim 3, wherein the support part (72) is fastened to the structural front portion (4) by means of a clamping bolt engaged in a square hole (75), extending along the second axis (Y) and along the third axis (X).

5. An assembly according to claim 3, wherein the centering and guide part (71) is fixed to the support part (72) by means of a clamping bolt engaged in an oblong hole (112) which is elongate along the first axis (Z).

6. An assembly according to claim 2, wherein the guide member (93) and the complementary guide member (95) are provided with indexing complementary shapes (125, 127) defining a nominal relative position of the fender front portion (5) and of the second end (43B) of the beam, from which position the adjustment movements take place.

7. An assembly according to claim 2, wherein the centering member (83) and the complementary centering member (85) have complementary frustoconical shapes organized to interfit coaxially along a common axis corresponding substantially to the third axis (X).

8. An assembly according to claim 2, wherein the guide member (93) is a slideway, and the complementary guide member (95) is a rail projecting from a flange (79) of the fender front portion (5).

9. An assembly according to claim 8, wherein the complementary guide member (95) is formed of a part with a reinforcement part (77) for reinforcing the flange, which part is separate and is mounted on and fastened rigidly to said fender flange (79).

10. An assembly according to claim 2, wherein the third axis (X) is such that it corresponds substantially to the longitudinal direction of the vehicle, when the assembly is mounted on the vehicle.

11. An assembly according to claim 2, wherein the fender front portion (5) is made of a plastics material.

12. A motor vehicle including a front portion assembly according to claim 1.

* * * * *